United States Patent [19]
Hassell

[11] 3,977,695
[45] Aug. 31, 1976

[54] LOG BUNK WITH RELEASABLE STAKES HAVING A POSITIVE, REMOTELY OPERATED LATCHING MECHANISM

[76] Inventor: Dennis Ray Hassell, 250 Dead Indian Road, P.O. Box 219, Ashland, Oreg. 97520

[22] Filed: May 5, 1975

[21] Appl. No.: 574,743

[52] U.S. Cl. .............................. 280/145; 105/160
[51] Int. Cl.² ........................................ B60P 7/00
[58] Field of Search ............ 280/145, 179; 105/160, 105/382, 386; 296/11, 43

[56] References Cited
UNITED STATES PATENTS
| | | | |
|---|---|---|---|
| 2,990,192 | 6/1961 | Leach | 280/145 |
| 3,129,955 | 4/1964 | Hassell | 280/145 |

*Primary Examiner*—Philip Goodman
*Attorney, Agent, or Firm*—Eugene D. Farley

[57] ABSTRACT

A log bunk having releasable stakes, secured in the upright position by a positive latching mechanism enclosed totally within the bunk. The invention provides a latch mechanism wherein the stakes can be released from either end of the bunk.

7 Claims, 8 Drawing Figures

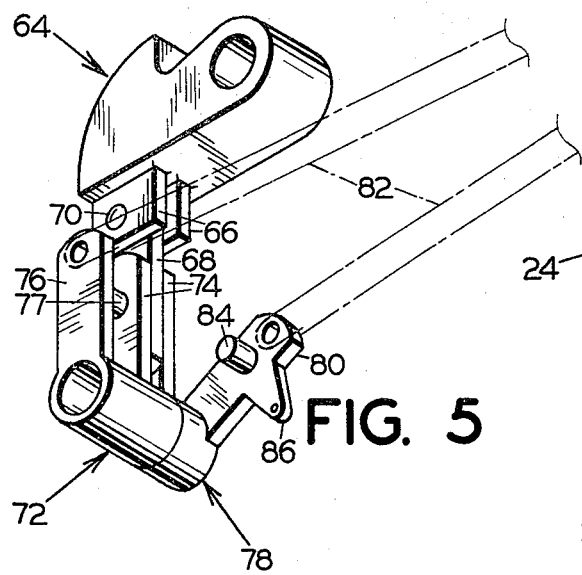
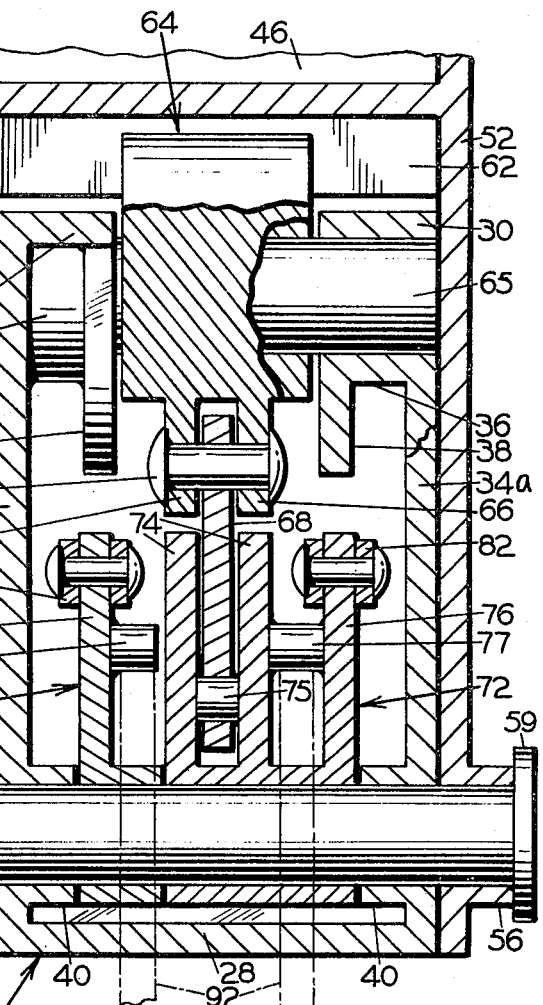
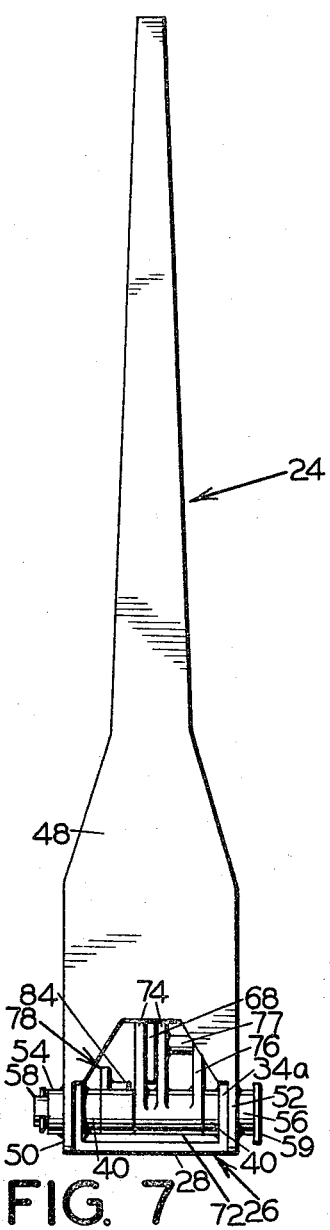
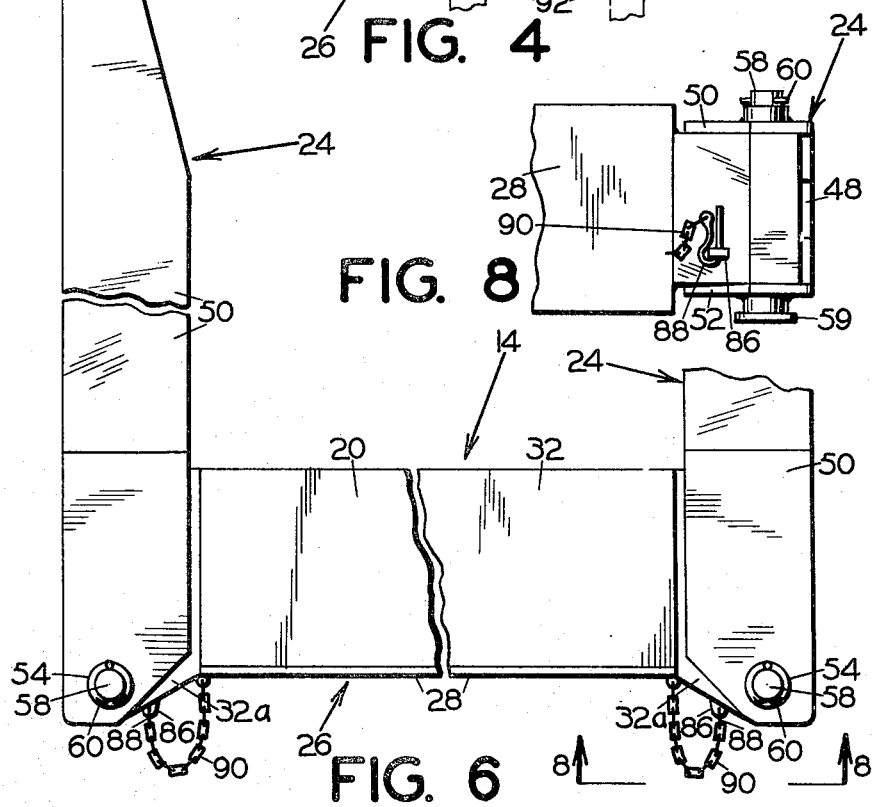

LOG BUNK WITH RELEASABLE STAKES HAVING A POSITIVE, REMOTELY OPERATED LATCHING MECHANISM

BACKGROUND OF THE INVENTION

This invention relates to log bunks of the class used for retaining logs on logging vehicles. Although it is intended for use primarily on log trucks, it may be adapted for use on railroad cars or other means of log conveyance.

Vehicles employed in transporting logs are provided with two or more bunks extending transversely of the vehicle at spaced intervals and provided at their ends with stakes for retaining the loaded logs. After the load has been transported to its destination and is ready to be discharged, the stakes are latch-released, permitting the logs to roll off. Because of the great weight and cumbersome character of the logs, their transportation and discharge in this manner obviously is dangerous, and many accidents are caused by failure of the bunk or stake mechanism.

The prior art latching systems used in the operation of these releasable stakes, are generally of two types. One type utilizes spring biasing or other return means to return the latch to a latched position automatically after release of the stakes. This type of latching mechanism is shown in my prior patent U.S. Pat. No. 3,033,542. Latching mechanisms of this class normally are contained inside the stake.

The second type of latching mechanism commonly used employs positive means for latching and unlatching the stake. Positive latching systems in general have required certain portions of the latching mechanism to be placed outside the stake, or have required that the stakes be offset from one another longitudinally of the vehicle to accommodate the latching mechanism.

The present invention, on the other hand, provides a positive stake latching mechanism which is totally enclosed in the bunk stake body, thereby leaving the stake exterior free to accomodate necessary attachments, such as lights and piggy-back carriers. In addition, the stakes can be mounted on the bunk without being longitudinally offset from each other, thereby increasing the load which they are capable of carrying. Furthermore, mounting the latch release mechanism inside the stake keeps the mechanism clear of debris and other foreign matter, and protects it from physical damage during loading and unloading operations.

Lastly, most prior art release type stakes cannot be removed from the logging vehicle bunks without expending considerable time and expense. This is disadvantageous since the stakes become damaged from time to time due to their necessarily rough usage. Their removal and replacement accordingly quite often are required. Also, when long stakes are used in certain types of logging operations, their removal frequently is desired to minimize clearance problems when the vehicle is travelling piggy-back and unloaded.

Accordingly, the general object of the present invention is to provide a log bunk having releasable stakes operated by a positive latching mechanism totally enclosed within the stake.

It is a further object of the present invention to provide a log bunk with positively latching, releasable stakes wherein the stakes are not longitudinally offset from one another.

It is a further object of the present invention to provide such a latching mechanism which can be operated alternatively from either side of the vehicle.

It is a further object of the present invention to provide a latching mechanism for releasable stakes wherein damage to or breakage of one of the latching elements will not cause the stakes to become unlatched.

It is a further object of the present invention to provide releasable stakes which can be easily removed from the bunk if desired.

THE DRAWINGS

The manner in which the foregoing and other objects of the invention are accomplished will be apparent from the accompanying specification and claims considered together with the drawings wherein:

FIG. 4 is a sectional end view of the bunk taken along line 4—4 of FIG. 2.

FIG. 5 is a fragmented, pictorial view showing the latching mechanism of the bunk of my invention.

FIG. 6 is a side elevation, foreshortened, showing the exterior portions of my log bunk and stakes.

FIG. 7 is an end view of one of the stakes of my invention.

FIG. 8 is a fragmentary inverted plan view of the bunk of FIG. 6 looking in the direction of the arrows on line 8—8 of that figure.

GENERAL STATEMENT OF THE INVENTION

My invention provides releasable stakes for use on log bunks commonly employed on logging vehicles.

A plurality of transversely oriented bunks are positioned at spaced intervals along the length of a logging vehicle in the common manner. Each bunk includes an enclosed box-type frame with bushings located in the top outer portion to carry pivoting latching means.

Two generally rectangular, elongate stakes are positioned on each bunk, one on each of the extremities. The stakes have side plates which overlie the bunk frame for pivotable joinder therewith. Located within the medial portion of the stakes are latch blocks configured to engage latching means.

The latching means include stake-latching dogs pivotably mounted within the bunk frame and engaging the stake latch blocks when the stakes are in the raised position. First latching dog operating means, pivotably mounted in the bunk frame, are linked to the latching dogs to allow positioning of the dogs in either a latched or unlatched position.

Second latching dog operating means, also pivotably mounted in the bunk frame, are interconnected to the opposed first latching dog operating means for remote operation of the stake latching dogs. Lugs, attached to the second latching dog opeating means, protrude through access holes in the bunk frame to allow insertion of locking pins in order to secure the latching mechanism.

The stakes are removable from the bunk frame by withdrawal of the pins upon which they pivot.

DETAILED DESCRIPTION OF A PREFERRED EMBODIMENT

Figure 1:
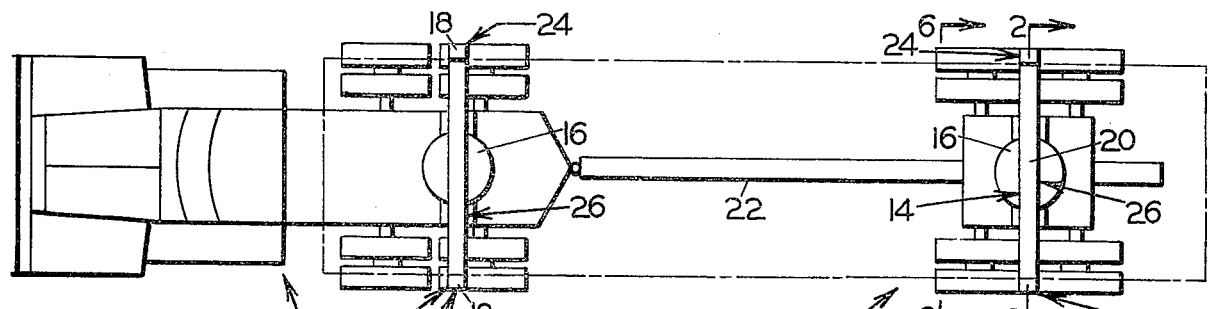
FIG. 1 is a plan view of a log truck showing the installation of my log bunks thereon.
Figure 3:
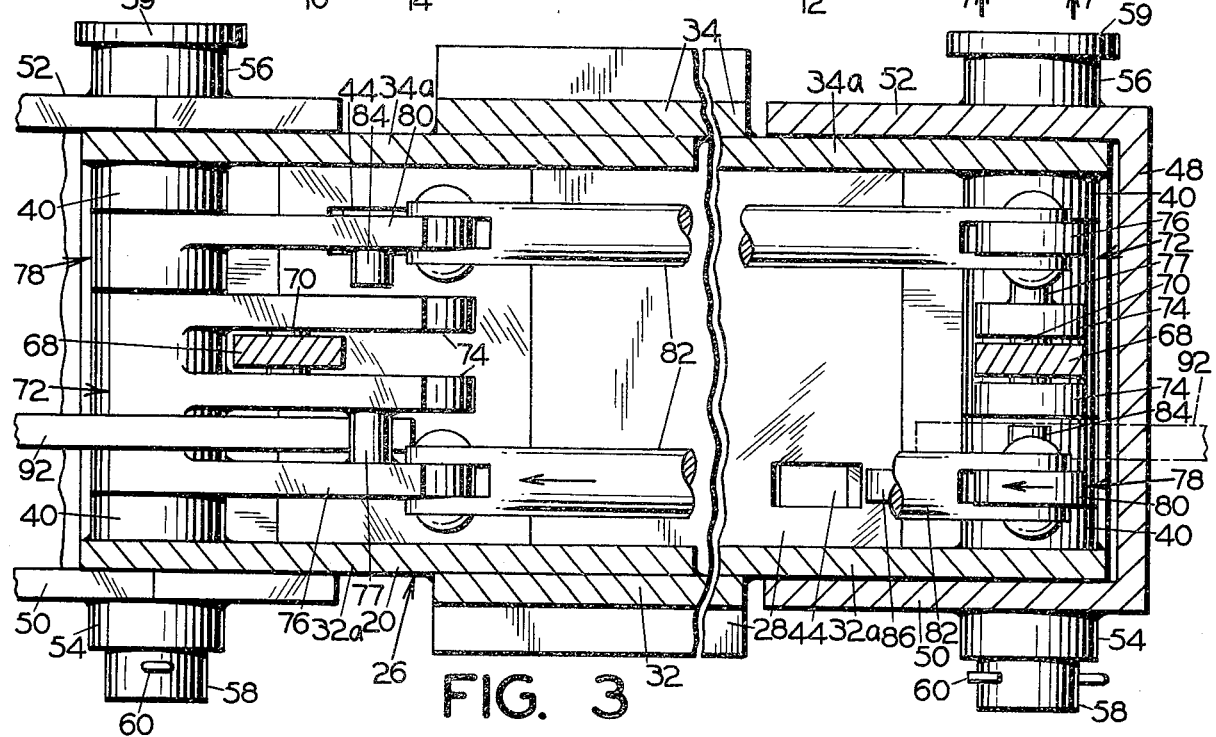
FIG. 3 is a fragmentary, sectional, inverted plan view of the bunk taken along line 3—3 of FIG. 2.

As shown in FIG. 1, the present invention is generally utilized on a log truck comprising tractor 10 and trailer 12. Each normally carries a log bunk 14 of the present invention by pivotable joinder means 16. The common arrangement is to place forward log bunk 18 on the tractor above its rear axle and rearward log bunk 20 on the trailer above its axle.

Trailer 12 is joined to tractor 10 by horizontal tongue 22. The logs are loaded on the bunks and maintained within the dashed line area by stakes 24 extending vertically upward from the ends of each bunk.

When the truck is empty, trailer 12 is often transported piggy-back above the tractor. Trailer rider pads (not shown) are generally placed on the rear portion of the tractor near forward log bunk 18 for this purpose.

Figure 2:
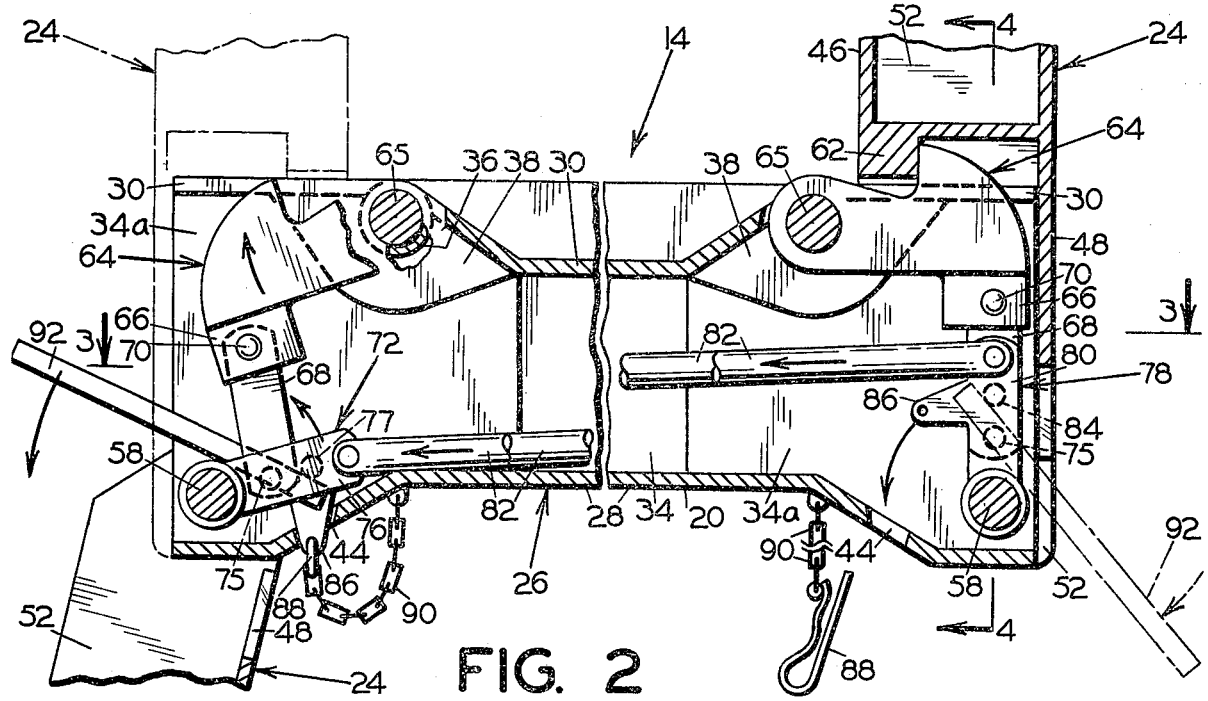
FIG. 2 is a fragmentary side elevation, foreshortened and partially broken away, of the log bunks taken along line 2—2 of FIG. 1.

In FIG. 2 the log bunk of the present invention is shown in vertical cross-section in order to illustrate the details of the stake release mechanism and the latching elements. The right-hand stake is shown in the raised or latched position; the left-hand stake, in the lowered or unlatched position. For convenience the left-hand stake is also shown in phantom as it would appear in the raised position.

The bunk generally provides frame 26 which is of a length substantially equal to the width of the vehicle. It is provided with pivotable mounting means (not shown) for attachment to the vehicle as is commonly employed in the industry. On trucks it is normal to provide two such bunks, one located on the tractor, and one located on the trailer.

Still referring to FIG. 2, frame 26 comprises a boxlike framework which includes base plate 28, top plate 30, and opposed side plates 32, 34 all extending substantially the whole length of frame 26. Base plate 28 and top plate 30 angle upwardly and downwardly, respectively, a short distance inwardly from each extremity, then continue outwardly providing a greater frame height at the end portions to contain the release and latching mechanism. The outer portions of side plates 32, 34 are offset inwardly as shown at 32a, 34a, respectively, to allow attachment of the stake without any increase in bunk width.

Immediately inwardly adjacent the upwardly angled portion of top plate 30, stake latching dog bushings 36 are positioned laterally across the frame. Depending strengthening webs 38 add stiffness. Inwardly extending bushings 40 are positioned adjacent the lower portions of the outer extremities of side plates 32a, 34a, respectively. Access slots 44 are located in the downwardly angled portion of base plate 28. The ends of frame 26 are uncovered to allow access to the release and latching mechanism.

Stakes 24 are pivotally mounted, one at each end of bunk frame 26, and are also generally of box-type framework. Thus, each comprises a front plate 46, a back plate 48, and a pair of side plates 50, 52. The stake side plates are of a substantial length to overlie the offset extremities of side plates 32a and 34a of the bunk frame. Front plates 46 are of a restricted length with their lower ends extending to approximately the upper edge of the frame when the stakes are installed and in the raised position.

Outwardly extending bushings 54, 56 are positioned adjacent the lower portion of side plates 50, 52, coaxial with bushings 40, when the stakes are installed on the bunk frame. Mounting pins 58 having heads 50 are installed through bushings 40, 54, 56 and secured by cotter pins 60. Hence, the stakes can be moved angularly between raised position, in which the logs are retained on the vehicle, and lowered position, in which the logs may be discharged from the vehicle.

Latch means are provided for releasably locking the stakes in their raised position. To this end, latch blocks 62 are positioned across the medical portion of the stakes upwardly adjacent top plates 30 of the bunk frame. Stake latching dogs 64 are journaled on bearing pins 65, positioned within stake latching dog bushings 36, for releasable engagement with latch blocks 62.

Stake latching dogs 64 comprise head portions, having working surfaces dimensioned for latching engagement with latch blocks 62, and attachment portions for joinder with the latching linkage. The attachment portions of stake latching dogs 64 include a pair of depending lugs 66 spaced apart to pivotably carry latching dog linkage means 68, through pin 70. Latching dog linkage means 68 extend downwardly to pivotable joinder at their lower portion with first latching dog operating means 72.

First latching dog operating means 72 are provided for operation of latching dog linkage means 68 and thus latching dog 64. They are pivotably journaled in the lower portion of frame 26 by pins 58. First latching dog operating means 72, best shown in FIGS. 4 and 5, comprise bifurcated tripping arm means 74 pivotably joined through pin 75 to first latching dog means, like configured lever arm means 76, and fulcrum pins 77 rigidly joined therebetween. The bifurcated tripping arm means and the lever arm means, of like dimension, both are attached to the journaled portion of first latching dog operating means 72 for common pivotable movement.

Second latching dog operating means 78 are provided for remote operation of opposed first latching dog operating means 72. They are also journaled on bearing pins 58, and are adjacent the first latching dog operating means, however, are pivotably independent. Activating arm 80, dimensioned similar to lever arm means 76, extends outward from second latching dog operating means 78 to pivotable joinder with control rod 82. Truncated fulcrum pins 84 are inwardly extending from joinder to activating arm 80, approximately co-planer with fulcrum pin means 77.

Locking lugs 86 extend from joinder with activating arm 80 and are dimensioned to extend through access slots 44, in frame 26, when the operating means are positioned to place the latching dog in the latched position. Pins 88, which are attached to the frame by chain 90, can be inserted through holes in lugs 86 to secure them within the access hole and lock them against inadvertent unlatching.

Control rod 82 extends on one end from pivotable joinder with one of the activating arms 80, to pivotable joinder with the opposed lever arm means 76 on other end. Thus, the opposed activating arm and lever arm are interconnected for simultaneous, but reversed, operation.

OPERATION

The operation of the bunk assembly herein described is readily apparent from the foregoing and from the accompanying drawings. When logs are loaded on the vehicle, all of the stakes are in the upright position, as shown in FIG. 6. Referring now to FIG. 2, the right-hand stake is shown in the raised position with stake latching dogs 64 securely seated against latch blocks 62. The first latching dog operating means is thus oriented substantially vertical. The opposed second latching dog operating means, shown in the left-hand side of FIG. 2, is substantially horizontal with locking lug 86 extending through access slot 44 and pin 88 installed. Accordingly, the latches are locked and cannot become unlatched until the pin is removed. The pictorial view in FIG. 5 shows the latching mechanism in this latched position.

When it is desired to release the stake and unload the logs, the pin opposite the stake desired to be released is removed. Activation means, such as lever 92, are inserted into the end of the stake, opposite the stake to be released, into second latching dog operating means 78, between the journal of pin 58 and truncated fulcrum pin 84. The activation means are moved downward to the position shown by the phantom lines on the right-hand side of FIG. 2. Thus, activating arm 80 is rotated upward, translating control rod 82 to the right, lowering the first latching dog operating means 72 downward, releasing the latching dog. The weight of the logs then pushes the stake outwardly to the log-discharging position.

After the logs have been unloaded, the stake may be lifted upwardly to its raised position. Then, to secure the latch, activation means 92 are inserted into the end of the just raised stake, this time into first latching dog operating means 72, between the journal of pin 58 and fulcrum pin means 77, as shown in the left-hand side of FIG. 2. The activation means are moved downwardly, as shown by the arrows, rotating first latching dog operating means 72 upwardly, returning stake latching dog 64 to the latched position for engagement with stake latch block 62.

Simultaneously, control rod 82 is translated to the left rotating the opposed second latching dog operating means downwardly to position locking lug 86 through access slot 44. The latching means are then secured by inserting pin 88 into locking lug 86.

If it is desired to release the stakes located on the opposite side of the bunk, the reverse procedure is employed to unlatch the release mechanism.

It is to be particularly noted that the device positively secures the stake in the raised position when the latch is installed. Even in the event latching dog linkage means 68 should fail, the mechanism will remain latched. In this event, lugs 66 would only drop to the point of interference with bifurcated tripping arm means 74, which would still be maintained in the latching position by control rod 82. Thus, stake latching dog 64 would remain engaged with latch block 62.

It is also to be noted that the stake is easily removed from the bunk for replacement, repair, or during transportation of the trailer. Pin 58 is simply removed from the frame and the stake lifted off the bunk. Also as the stakes are completely enclosed when installed on the bunk frame, the latching mechanism is kept clear from debris and the outside is clean allowing mounting room for various accessories.

Furthermore, the stakes are not longitudinally offset as are prior art stakes of the positive latching type. This provides greater stake strength thus increased carrying capacity, particularly with large irregularly shaped logs.

In addition, it will be noted that the particular positive latching mechanism of the present invention prevents accidental stake release. The separate locking elements and the removable activation means eliminates inadvertent tripping of the latching mechanism and the particular design of the latch eliminates tripping in the event one element should break.

It is to be understood that the form of my invention herein shown and described is to be taken as a preferred example of the same and that various changes in the shape, size, and arrangement of parts may be resorted to without departing from the spirit of my invention.

Having thus described my invention I claim:

1. A log bunk comprising a frame adapted for pivotable mounting transversely of the vehicle, a stake, pivot means securing the lower end of the stake to an end of the frame for angular movement between raised and lowered positions, a stake latching dog pivotably mounted on said end of the frame, movable between latched and unlatched positions with respect to the stake, latching dog linkage means connected pivotally at one end to the stake latching dog for moving the stake latching dog to either the latched or unlatched position, first latching dog operation means connected pivotally to the opposite end of the linkage means and pivotably mounted on said end of the frame for operation of the latching dog linkage means from a station adjacent the stake, and second latching dog operation means pivotably mounted on the opposite end of the frame for remote operation of the first latching dog operating means.

2. The log bunk of claim 1 having in addition locking means to secure the second latching dog operating means and hence the latching dog in the latching position.

3. The log bunk of claim 1 wherein the first latching dog operating means comprises pivotably mounted bifurcated tripping arm means pivotably carrying the lower extremity of the latching dog linkage means, lever arm means rigidly joined parallel to the tripping arm means, and fulcrum pin means medially interconnecting the tripping arm means and lever arm means.

4. A log bunk comprising a frame adapted for pivotable mounting transversely of the vehicle, a stake, pivot means securing the lower end of the stake to an end of the frame for angular movement between raised and lowered positions, a stake latching dog pivotably mounted on said end of the frame, movable between latched and unlatched positions with respect to the stake, latching dog linkage means configured to allow placing the stake latching dog in either of the latched or unlatched position, first latching dog operating means pivotably mounted on said end of the frame for operation of the latching dog linkage means from a station adjacent the stake, the first latching dog operating means comprising pivotably mounted bifurcated tripping arm means pivotably carrying the lower extremity of the latching dog linkage means, lever arm means rigidly joined parallel to the tripping arm means, and fulcrum pin means medially interconnecting the tripping arm means and lever arm means, and second latching dog operating means pivotably mounted on the opposed end of the frame for remote operation of the first latching dog operating means, the second latching dog operating means comprising activating arm means mounted coaxially with the tripping arm means and pivotably independent therefrom, an inwardly facing truncated fulcrum pin joined to the medial portion of the activating arm means, and a control rod connected on one end to the activating arm means and on the other end to the opposed lever arm means.

5. The invention of claim 4 further characterized by removable activation means utilized in the operation of the tripping linkage operating means.

6. The invention of claim 5 wherein the activation means comprises a lever insertable into the latching dog operating means.

7. A log bunk comprising a frame adapted for pivotable mounting transversely of the vehicle, a stake, pivot means securing the lower end of the stake to an end of the frame for angular movement between raised and lowered positions, a stake latching dog pivotably mounted on said end of the frame, movable between latched and unlatched positions with respect to the stake, latching dog linkage means configured to allow placing the stake latching dog in either the latched or unlatched position, first latching dog operating means pivotably mounted on said end of the frame for operation of the latching dog linkage means from a station adjacent the stake, second latching dog operating means pivotably mounted on the opposed end of the frame for remote operation of the first latching dog operating means, and locking means to secure the second latching dog linkage operating means and hence the latching dog in the latched position; the first latching dog operating means comprising pivotably mounted bifurcated tripping arm means pivotably carrying the lower extremity of the latching dog linkage means, lever arm means rigidly joined parallel to the tripping arm means, and fulcrum pin means medially interconnecting the tripping arm means and lever arm means; and the second latching dog operating means comprising activating arm means mounted coaxially with the tripping arm means and pivotably independent therefrom, an inwardly facing truncated fulcrum pin joined to the medial portion pf the activating arm means, and a control rod connected on one end to the activating arm means and on the other end to the opposed lever arm means.

* * * * *